(12) United States Patent
Moss et al.

(10) Patent No.: US 6,408,699 B1
(45) Date of Patent: Jun. 25, 2002

(54) MULTIPLE FREQUENCY DOPPLER FLOW METER

(75) Inventors: Robert A. Moss, Sugarland; Michael Masterov, Houston, both of TX (US)

(73) Assignee: Polysonics, Inc., Houston, TX (US)

( * ) Notice: Subject to any disclaimer, the term of this patent is extended or adjusted under 35 U.S.C. 154(b) by 0 days.

(21) Appl. No.: 09/166,989

(22) Filed: Oct. 6, 1998

(51) Int. Cl.$^7$ ................................................. G01F 1/66
(52) U.S. Cl. .................................. 73/861.26; 73/861.25
(58) Field of Search ........................ 73/861.26, 861.25, 73/861.27, 861.28, 861.29, 861.31, 861.18, 861

(56) References Cited

U.S. PATENT DOCUMENTS

| | | | | | |
|---|---|---|---|---|---|
| 3,568,661 | A | * | 3/1971 | Franklin | 73/861.29 |
| 4,391,149 | A | * | 7/1983 | Herzl | 73/861.25 |
| 4,434,669 | A | * | 3/1984 | Roberts et al. | 73/861.25 |
| 4,541,437 | A | * | 9/1985 | Amemiya | 73/861.25 |
| 4,545,244 | A | * | 10/1985 | Yasuda et al. | 73/861.25 |
| 4,690,002 | A | * | 9/1987 | Hubbard et al. | 73/861.25 |
| 4,780,837 | A | * | 10/1988 | Namekawa | 73/861.25 |
| 5,669,386 | A | | 9/1997 | Thiele et al. | 128/661.08 |

* cited by examiner

*Primary Examiner*—Harshad Patel
(74) *Attorney, Agent, or Firm*—Fulbright & Jaworski L.L.P.

(57) ABSTRACT

The present invention relates to a method and system for measuring fluid velocity in pipes alternately transmitting two or more ultrasonic frequencies through a pipe wall into a fluid containing scatterers. For each transmission frequency, energy reflected from the scatterers is mixed with the transmission frequency and the result sampled at a rate which is a constant fraction of the transmission frequency. The combination of the Doppler effect on frequencies reflected from the moving scatterers, and the described sampling rate scheme combine to permit isolation of velocity related frequencies from extraneous frequencies in the reflected energy in a computationally efficient manner. A single frequency which represents fluid velocity is extracted from the gathered data, and the fluid velocity readily calculated therefrom using the Doppler formula. The invention provides a system and method for measuring fluid velocity which is simple, reliable, and cost effective.

35 Claims, 4 Drawing Sheets

MULTIPLE FREQUENCY DOPPLER FLOW METER

BACKGROUND OF THE INVENTION

Often, it is necessary to measure the rate of fluid flow within a closed pipe. Non-invasive measurement methods are preferred because such methods do not detrimentally effect the fluid flow or pipe wall. There are two dominant methods of non-invasive flow rate measuring: "Doppler ultrasonic" and "Ultrasonic transit time." Both methods utilize the transmission of ultrasound through the pipe wall and into the fluid.

Doppler ultrasonic uses two ultrasonic transducers coupled to the pipe. The first transducer transmits a continuous ultrasonic signal through the pipe wall and into the fluid. Assuming the moving fluid contains bubbles or solids which can act as acoustic scattering sites, or "scatterers", the second transducer receives scattered ultrasound signals. Then, the frequency of the scattered signal is compared with that of the transmitted signal. The frequency shift between the transmitted and received signals is proportional to the velocity of the scattering sites and, therefore, indicates the velocity of the fluid in the pipe.

In many industrial applications, vibrations from motors and other extraneous sources create frequencies in the pipe that are received by the ultrasonic sensor along with the Doppler shifted frequencies of interest. The detection system used to determine the Doppler frequency may select noise or other ambiguous signals, causing erroneous velocity measurements.

One past approach to dealing with the problem of extraneous frequencies involved the use of digital filters to mask out erroneous frequencies. This method assumes the noise source is stationary and continuous. This is often not the case in industrial applications. Variable frequency motor controls are now commonly used to control pumps, resulting in the presence of a range of noise frequencies some of which can get past the filters. Further, automated system controllers continuously turn noise generating equipment off and on, resulting in still further variation in the range of extraneous frequencies. Finally the digital filters can be complex to use.

There is a need in the art for a method and system for measuring flow rate with improved reliability and consistency which will not be subject to the confusion caused by extraneous frequencies being received by existing Doppler flow system transducers.

There is a another need in the art for a method and system which will accomplish such flow rate measurement without the need for customer installed filters.

There is yet another need in the art for a method and system for measuring flow rate which simplifies the user's interaction with the required equipment.

There is yet another need in the art for a method of determining fluid flow rate in real time with maximum computational efficiency.

SUMMARY OF THE INVENTION

These and other objects, features and technical advantages are achieved by a system and method for determining the velocity of a flowing fluid by measuring the Doppler shift of two or more ultrasonic waves reflected from scatterers carried in a flowing fluid. This flowing fluid contains a dispersion of scatterers which comprise various bubbles and solids which reflect incident ultrasonic waves.

A series of ultrasonic waves is transmitted into the flow at a specific frequency and reflects off the flowing scatterers. The corresponding Doppler shifted reflection for this series of waves is subtracted from the transmitted waves and the result collected. A second series of waves at a different frequency is then transmitted into the flow and a second corresponding Doppler shifted reflection is subtracted from the transmitted waves and the result collected. For both series, the result of the subtraction contains Doppler beat frequencies representing the velocity of the fluid.

Performing a Discrete Fourier Transform (DFT) on the first subtracted series will reveal concentrations of energy at particular frequencies, some of which result from the scatterers and some of which result from extraneous noise. Similarly, a second DFT performed on the second subtracted series will also reveal frequency peaks representing both the Doppler beat frequencies and extraneous noise. The embedded noise and other extraneous signal peaks will be at similar frequencies in both subtracted signals while the Doppler beat frequencies will be separated by a difference proportional to the ratio of the transmitted frequencies.

This absence in variation of the noise frequencies between the two series of sampled waves permits the frequencies of interest to be isolated from the extraneous noise frequencies. The second collected series of frequencies is intentionally scaled by the ratio of the two transmission frequencies. This causes the Doppler beat frequencies to align and the noise frequencies to misalign. The "scaling" referred to above is performed on the second (and all additional sets if applicable) set of DFT data, and consists of the following: for each data point consisting of a frequency associated with an amplitude, multiplying the frequency datum by the ratio of the first transmission frequency to the second transmission frequency. This operation compensates for the inherent property of the Doppler effect which, for the same fluid and scatterer velocity, generates reflected velocity related Doppler beat frequencies (frequencies present after mixing) which are proportional to the frequency of the signal originally transmitted into the fluid.

A further improvement to the implementation of this method takes advantage of an inherent property of the DFT. By setting the sampling rate to be proportional to the transmission frequency for each series of data collected, the sampling time interval for the subtracted signal and the resulting frequency increment of the calculated DFT will be inversely proportional to the transmission frequency. Since the measured Doppler shifted beat frequency associated with a particular velocity is directly proportional to the transmission frequency employed, the sampling frequency adjustment mentioned above automatically compensates for the Doppler effect, thus obviating the need for mathematically scaling the frequency data after calculating the DFT. This represents an advantage because mathematically scaling the data is computationally expensive, and this invention concerns a real time process in which processing power must be optimally employed.

After sampling at the rate established for each transmission frequency and performing the DFT for two sets of data, the velocity related frequency data for the two data sets will converge within a reasonable frequency range without having to perform a separate calculation to mathematically scale the frequency values for the data collected at the lower transmission frequency. The scaling process effected by the variation in sampling rates will cause noise and other extraneous frequencies, which are the same between the two data sets prior to the sampling process, to misalign once the scaling is performed.

The aligned Doppler shifted peaks are detected by finding the maximum amplitude, or apex, of a correlation performed on the two sets of DFT data. A frequency distribution is identified as the Doppler distribution based on the location of this apex. Then, the centroid of the selected frequency distribution is determined and used as the measurement frequency, which is then used to calculate the velocity of the fluid. The fluid flow can then be determined by multiplying the cross-sectional area in the pipe by the fluid flow velocity.

It must be emphasized that although the above discussion has concentrated on the operations involved in determining fluid velocity using two transmission frequencies, the same principles can be readily applied for any number of additional transmission frequencies.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE INVENTION

This discussion assumes a familiarity with various signal processing techniques and with the Doppler effect. Those seeking background knowledge of the methods and techniques described herein are advised to consult the following references which are hereby incorporated by reference.

With respect to The Doppler effect, see:

*Ultrasonic Technology,* Richard Goldman, 1962, Reinhold Publishing Corporation, London, U.K.;

*Ultrasonics: Fundamentals,* Technology, Applications, Second Edition, Dale Ensminger, 1988, Marcel Dekker, Inc., New York, N.Y.; and

*Ultrasonic Measurements for Process Control,* 1989, L. C. Lynnworth, Academic Press, Inc. San Diego, Calif.

With respect to Signal processing, see:

*Signals, Systems, and Transforms,* Charles L. Phillips & John M. Parr, 1995, Prentice-Hall, Inc., Englewood Cliffs, N.J.

*Digital Signal Processing,* in VLSI, Richard Higgins, 1990, Prentice-Hall, Inc. Englewood Cliffs, N.J.

Figures 1, 4, 5:
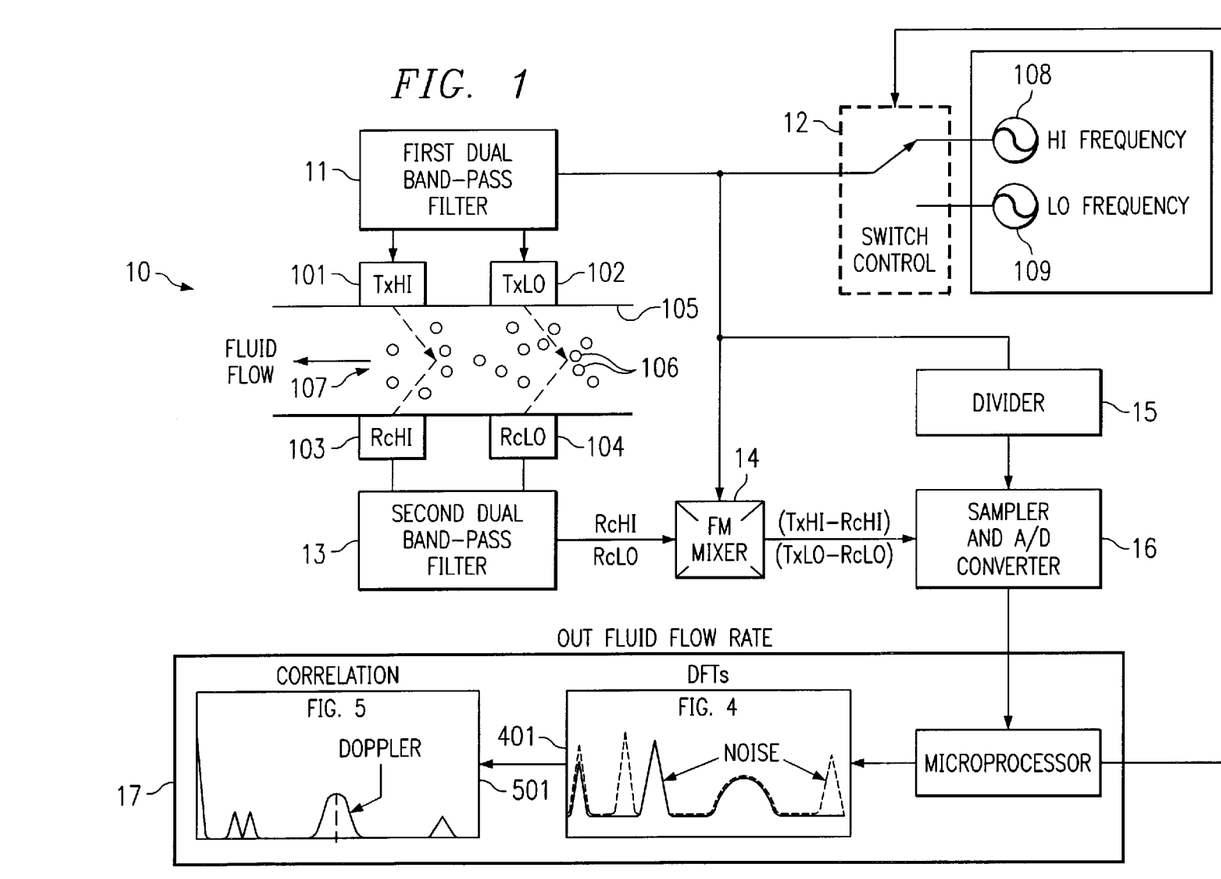
FIG. 1 is a diagram of the control functions and mechanical operations of a hardware implementation of the present invention.
FIG. 4 is a frequency spectrum representation of energy arriving at the A/D converter associated with two different transmission frequencies where the frequency values of the curves have been scaled.
FIG. 5 illustrates the result of performing a correlation on the curves displayed in FIG. 4.

FIG. 1 illustrates a diagram of a flow meter 10 according to the present invention. Microprocessor 17 is coupled to Switch Control 12 to control the frequency selection, and to A/D converter 16 to control its sampling rate and to receive digital data from it. Switch Control 12 is coupled to two generators of sinusoidal electrical signals, the high frequency generator 108 and the low frequency generator 109.

The first Dual Band-Pass filter 11 is coupled to the output of the low and high frequency signal generators, and to the two piezoelectric transducer (PZT) transmitters: high frequency TxHi transmitting transducer 101, and low frequency TxLo transmitting transducer 102.

High frequency RcHi receiving transducer 103 and low frequency RcLo receiving transducer 104 are coupled to second dual band-pass filter 13. Second dual band-pass filter 13 is also coupled to Frequency Modulation (FM) mixer 14, which is, in turn, coupled to A/D converter 16. A/D converter 16 is coupled to divider 15, and microprocessor 17.

Microprocessor 17 is preferably a high performance, embedded microcontroller.

High and low frequency generators, 108 and 109 respectively, transmit sinusoidal electrical signals at different frequencies, such as, by way of example, 500 KHz and 640 KHz. High frequency transmitting transducer 101, and low frequency transmitting transducer 102, convert the received electrical signals into ultrasonic waves at the respective frequencies. Conversely, high frequency receiving transducer 103, and low frequency receiving transducer 104, convert received ultrasonic frequencies into electrical signals. Divider 15 acts to divide the active transmission frequency by a constant "N" to optimize the sampling rate at the A/D converter. It is noted that in an alternative arrangement, the frequency division could be performed by the microprocessor and the result transmitted to the A/D converter.

Microprocessor 17 sends a signal to switch control 12 to switch frequencies when appropriate. A high frequency (Hi-freq) sinusoidal signal is sent by High Frequency generator 108 to dual band-pass filter 11 which in turn directs the filtered signal to high frequency transmitting transducer 101, which converts the electrical energy to ultrasonic energy. This ultrasonic beam passes through the pipe wall 105 and into flowing fluid 107. The fluid carries scatterers 106 which reflect the ultrasonic beam in all directions. High frequency receiving transducer 103 receives reflected ultrasonic energy containing, along with extraneous signals, velocity related frequencies which are a function of both the active transmission frequency and the velocity of the scatterers in the fluid. The velocity of the scatterers when statistically averaged equals the velocity of the fluid. These velocity related frequencies are referred to as the Doppler shifted frequencies. The signal from high frequency receiving transducer 103 is then transmitted to the Dual band-pass filter 13 which filters the signal, acts to reduce crosstalk between the sensors, and sends the filtered signal to FM mixer 14, which subtracts the Doppler shifted frequency from the transmitted frequency, resulting in the Doppler beat frequency. This analog electrical signal is measured by an analog to digital converter (A/D) 16, at a sampling rate equal to the active transmission frequency divided by constant "N".

A series of these measurements is sent to microprocessor 17, which stores this data and sends out a command to switch frequencies to the switch control, which proceeds to select low frequency generator 109. The above described sequence is repeated identically for the low frequency signal using the low frequency components along the path. The following discussion states the sequence of events for the low frequency signal treatment while minimizing redundancy.

Low frequency generator 109 generates the signal which goes to dual band pass filter 11 which in turn transmits the filtered signal to the low frequency transmitting transducer 102. The low frequency transmitting transducer 102 converts this signal into ultrasonic waves. The low frequency receiving transducer 104 converts the received ultrasonic signal into an electrical signal and sends it in turn to dual band-pass filter 13. The signal is then sent to mixer 14 where the received frequency is subtracted from the transmitted frequency thereby generating the Doppler beat frequency for the case of low frequency transmission. The resulting analog electrical signal is then sent to A/D converter 16. This anal electrical signal is measured by an A/D converter 16, at a sampling rate equal to the active (in this case, low frequency) transmission frequency divided by constant "N".

As with the high frequency case, a series of these measurements is sent to microprocessor 17 which stores the data. Microprocessor 17 then sends a command to switch control 12 to again change frequencies. It can be readily observed that this will cause the entire process to repeat, performing all processes in an alternating manner between the high and low frequencies. Of course, any number of frequencies can be used, which can be selected by different system parameters, such as pipe thickness, fluid type, scatterer type, extraneous noise, among others.

One skilled in the art will recognize that the hardware illustrated in FIG. 1 is merely one way to implement the method discussed below. Alternate hardware embodiments are readily apparent and are clearly within the scope of the present invention.

Figure 2:
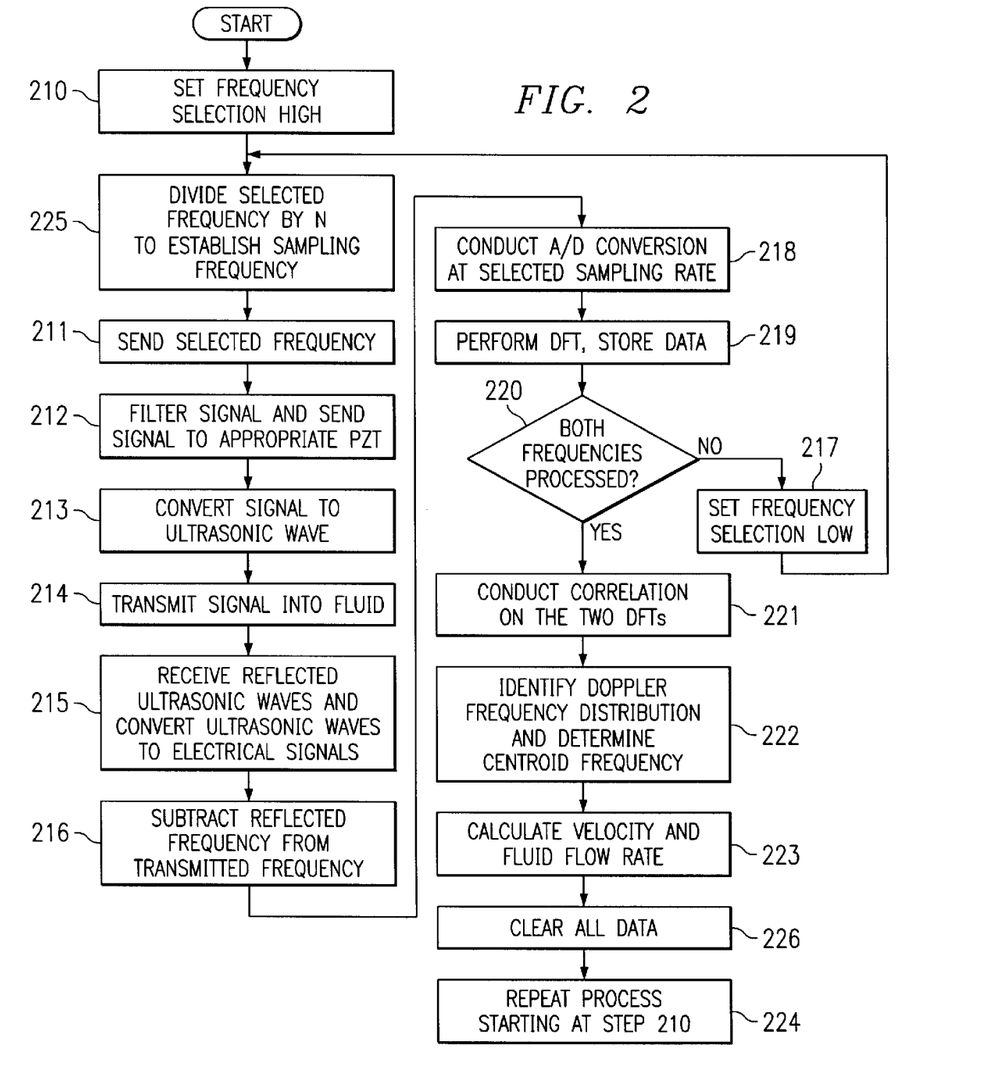
FIG. 2 is a flow chart illustrating the steps performed in the present invention.

FIG. 2 illustrates a flow chart of the method of measuring flow rate according to the present invention. The first step 210 is to set the transmission frequency selection to "high" to start the process. In subsequent runs through the process, microprocessor 17 will alternate between low and high transmission frequency settings. Next, at step 225, the selected frequency is divided by constant "N" to establish the sampling rate at which data will be sampled at the A/D converter 16. The next step 211, is to send a sinusoidal electrical signal of the selected frequency to dual band-pass filter 11 using the Switch Control 12. Next at step 212, dual band-pass filter 11 acts to selectively allow only the high or low selected frequency to pass through the filter, and then directs the filtered signal appropriately to either the high frequency transmitting transducer 101 or to the low frequency transmitting transducer 102 in accordance with the currently active transmission frequency.

The next step 213, is to convert the sinusoidal electrical signal into ultrasonic energy. This is accomplished by high frequency transmitting transducer 101 for high frequency signals, and by low frequency transmitting transducer 102 for low frequency signals. Next, at step 214, this ultrasonic energy is transmitted through the pipe wall 105 into the flowing fluid 107 so as to cause this energy to reflect off scatterers 106 dispersed throughout the fluid 107. The frequencies emanating from the scatterers 106 result from a combination of the transmitted frequency and the velocities of the scatterers, and form a Doppler shift frequency distribution.

At step 215, the reflected ultrasonic frequencies are received by the receiving transducer and converted into electrical signals by the High frequency receiving transducer 103 for high frequency transmissions, and by the low frequency receiving transducer 104 for low frequency transmissions.

At step 216, the Doppler beat frequency is produced by subtracting the values of the frequencies reflected off the scatterers from the value of the transmitted frequency using the FM Mixer 14. It is noted that the noise signals are not affected by the mixer and pass through to the A/D converter with their original frequencies intact.

At step 218, the analog signal emerging from the FM Mixer 14 is sampled by the A/D converter 16 at the sampling rate calculated in step 225. A series of measurements obtained by this sampling step is sent to the microprocessor 17.

At step 219, microprocessor 17 performs a Discrete Fourier Transform (DFT) on the series of measurements generated in step 218, thereby generating frequency domain data associated with the transmission frequency then in operation. Specifically, a Fast Fourier Transform (FFT), an algorithm formulated to calculate DFTs rapidly, is performed on the sampled data for the cases of high and low frequency transmission. The result of the computation is the generation of a data set for each transmission frequency used. Each data set consists of data points each of which associate a frequency with an amplitude.

For background information on Discrete Fourier Transforms (FFTs) and Fast Fourier Transforms (FFTs), the reader is referred to the following teaching reference: DIGITAL SIGNAL PROCESSING, by Proakis and Manolakis, Third Edition, Prentice Hall 1996. This teaching reference is hereby incorporated by reference.

At step 220, if data has been collected using both high and low transmission frequencies, operation continues at step 221. If only high frequency data has been gathered, the microprocessor 17 sets frequency selection to "low", in step 217, and repeats steps 211 through 219.

At step 221, a correlation between the DFTs for the data resulting from the low frequency transmission and from the high frequency transmission is performed by multiplying the DFT data together. As a result of the multiplication, the Doppler beat frequencies form a large identifiable apex 502 whereas the other frequencies will be misaligned. In step 222, the Doppler frequency distribution is identified and the centroid of the Doppler distribution is determined with precision. In step 223 the velocity is calculated from the centroid frequency using the Doppler formula and the flow is calculated by multiplying the velocity by the cross-sectional area of the pipe. Step 223 completes one full measurement of fluid flow rate.

At step 226, data is cleared from the microprocessor.

At step 224, the process begins anew beginning at step 210.

While the embodiment above includes the desirable benefit of setting the sampling rate at the A/D converter 16 equal to the transmission frequency divided by a constant "N", the invention may be practiced without this feature. Without establishing this relationship between transmission frequency and sampling rate, additional computation would have to performed on the frequency domain data to prepare for the correlation operation.

Figure 3:
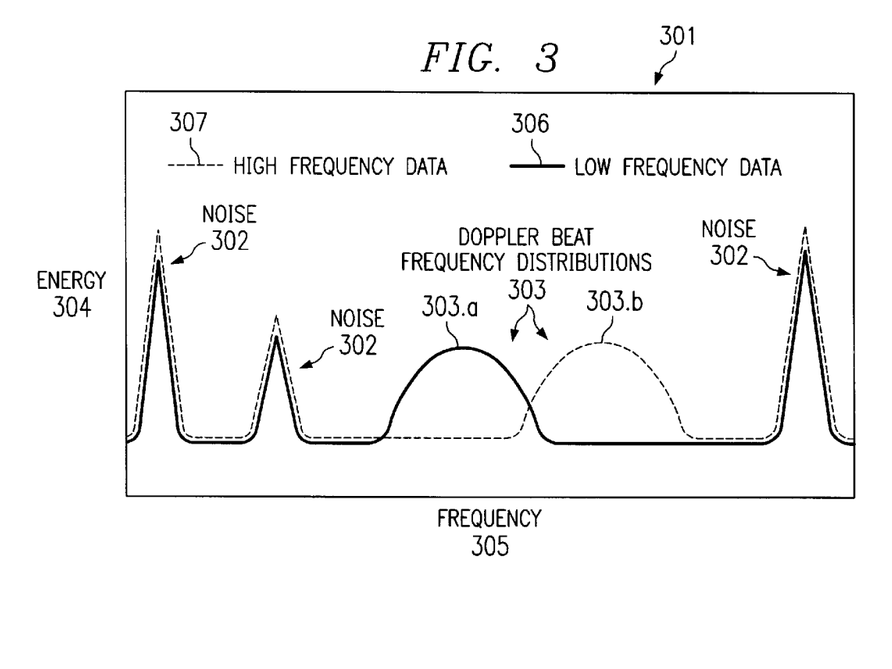
FIG. 3 is a frequency spectrum representation of the energy arriving at the A/D converter associated with two different transmission frequencies without frequency scaling.
Figure 4:
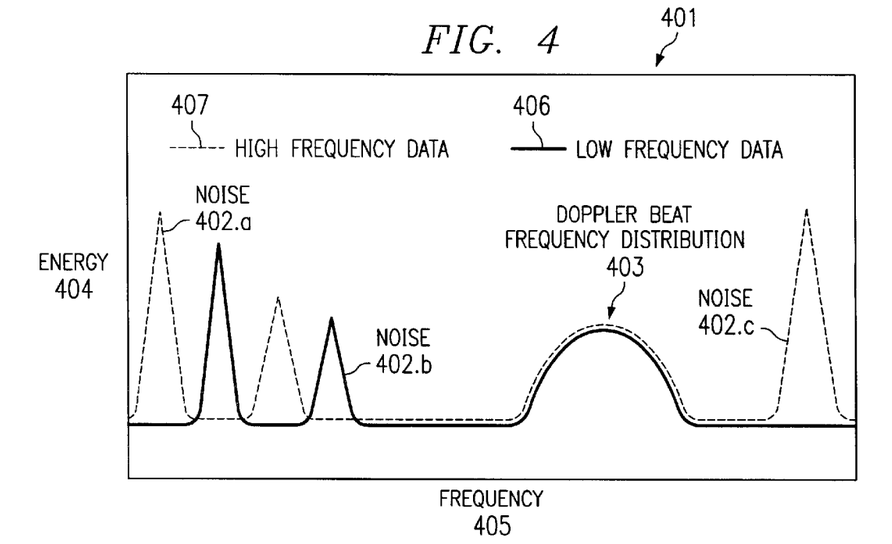
Figure 5:
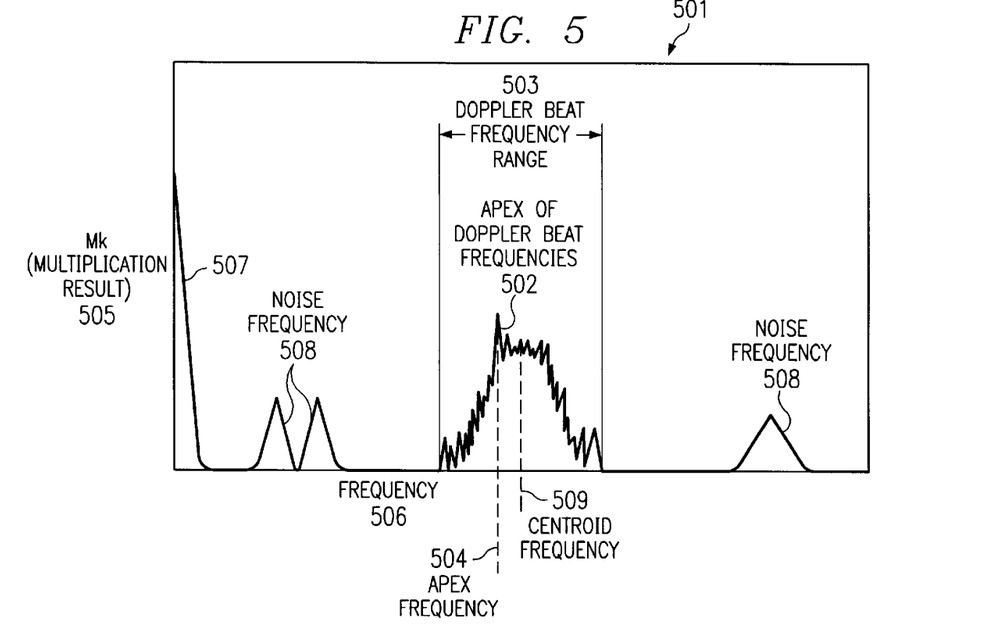

FIG. 3 presents a graphical representation 301 of the frequency spectrum of the energy arriving at AID converter 16. This figure represents data gathered for two separate transmission frequencies, for a single fluid velocity, with no scaling of frequencies having been performed. Energy 304 is plotted as a function of Frequency 305. The Noise frequency peaks 302 in the curve for data corresponding to low frequency transmission 306 are in line with the noise frequency peaks 302 in the curve for data corresponding to high frequency transmission 307. The noise signals have frequencies which are too low to be affected by the mixer 14, and are independent of the transmission frequency value. Therefore, the same noise frequencies arrive at the A/D converter for all transmission frequencies used. Consequently the noise frequency peaks 302 for the cases of different transmission frequencies are aligned.

By contrast, the Doppler beat frequencies emerging from the mixer vary proportionately with transmission frequency for the same fluid velocity. Accordingly, the Doppler frequency distributions 303 for the cases of high and low frequency transmission signals are misaligned.

FIG. 4 presents a graphical representation 401 of the frequency spectrum of the sampling data gathered at A/D converter 16 after scaling has been performed. The graph is the result of performing a Discrete Fourier Transform on the sampled data. Energy 404 on the vertical axis is plotted against Frequency 405 on the horizontal axis thereby indicating the signal strength of the various frequencies after scaling has been performed. Two separate groups of data are pictured: data collected during high frequency transmission indicated by the dotted line 407, and data collected during low frequency transmission indicated by the solid line 406. The frequency values for the low frequency graph have been scaled upwards by the ratio of the transmission frequencies. This scaling is preferably accomplished by appropriately setting the Sampling rate as in step 225 at the A/D converter 16, but can also be performed arithmetically. One skilled in the art will recognize that the required scaling could also be achieved through a combination of sampling rate control and arithmetic operation so long as the combination of the two yields the same overall scaling of the frequency values.

The noise frequencies 402 are indicated at three separate local peaks: 402.*a,* 402.*b,* and 402.*c.* The Doppler Beat frequency distribution 403 is also shown. This figure permits some visual appreciation of the present invention's mechanism for distinguishing between noise frequencies 402 and velocity related Doppler Beat frequencies 403. The noise frequency peaks 402.*a* and 402.*b* are displaced with respect to one another, although they originate from the same noise frequency, because the peak at 402.*b* represents that noise frequency effectively multiplied by a scaling factor equal to the ratio of the transmission frequencies (i.e. TxHi/TxLo). After this scaling operation, the noise peak 402.*b* forming part of the data set gathered for low frequency transmission 406 is moved up the frequency scale by the amount of the multiplication. Frequency peak 402.*b* is thereby separated on the frequency scale from frequency peak 402.*a.*

The Doppler Beat frequency distributions 303 of FIG. 3 which were misaligned, are now represented by element 403, and are aligned in FIG. 4 because of the scaling of the frequency values of the data set corresponding to the low frequency transmission signal. The scaling operation has acted to cancel the Doppler characteristic which caused the signals to previously be misaligned.

FIG. 5 presents a graphical illustration 501 of a correlation between the two plots of sampling data in FIG. 3. The Multiplication Result 505 on the vertical axis is plotted against frequency 506 on the horizontal axis. A single solid line 507 represents the value of the multiplication result for each frequency within the range of the graph.

The Multiplication result 505 is the mathematical product of the values of energy measured for the case of high frequency transmission and the case of low frequency transmission for every frequency in the frequency range 506 covered by the graph 501. It can be readily seen that the multiplication product 507 at noise frequencies 508 is low because of the misalignment of these frequencies in the graph of FIG. 4.

The relatively close alignment of the Doppler frequency distributions 403 in FIG. 4, result in a salient bulge in the multiplication result 507 within the Doppler Beat Frequency range 503. The peak value of the multiplication result 507 within the Doppler Beat Frequency range 503 is the Apex of the Doppler Beat Frequencies 502. The frequency at which this Apex 502 in the multiplication result 507 occurs is the Apex frequency 504. The frequency distribution in proximity to this apex is identified and the centroid of the distribution is calculated, leading to the determination of the centroid frequency 509. The centroid frequency 509 is used to calculate other quantities of interest such as the fluid flow velocity and the fluid flow rate.

The following discusses the mathematical principles underlying operations discussed in the textual description of the invention. The following derivation explains the principle of the Dual or Multiple Frequency Doppler flow meter. The general Doppler formula is:

$$V = \frac{C \cdot (Ftx - Frc)}{2 \cdot Ftx \cdot \cos(a)} \quad \text{let: } Df = (Ftx - Frc) \text{ then } V = \frac{C \cdot Df}{2 \cdot Ftx \cdot \cos(a)}$$

Where: C is the sonic velocity of the fluid or the speed of sound in the fluid; Ftx is the transmission frequency; Frc is the reflected frequency; Df is the Doppler Beat frequency; and cos(a) is the cosine of the angle of the incident beam relative to the direction of flow.

If ultrasonic beams are transmitted at two different frequencies into a constantly flowing fluid containing scatterers, the following relationship exists between the Doppler frequencies for the two different transmission frequencies.

$$\frac{C \cdot Df_a}{2 \cdot Ftx_a \cdot \cos(a)} = \frac{C \cdot Df_b}{2 \cdot Ftx_b \cdot \cos(a)} \qquad \text{Equation 1}$$

$$\frac{Df_a}{Ftx_a} = \frac{Df_b}{Ftx_b}$$

$$Df_b = \frac{Ftx_b}{Ftx_a} \cdot Df_a$$

Equation 1 proves the second Doppler signal is equal to the first Doppler signal multiplied by the ratio of the transmission frequencies.

It follows from Equation 1 that if:

the Doppler shifted frequency is proportional to the transmit frequency:

$$Df \alpha Ftx \text{ and}$$

the sample time interval is inversely proportional to the transmit frequency:

$$\frac{1}{\Delta t} \alpha Ftx$$

then $$\frac{1}{\Delta t} \alpha Df$$

or $$\frac{d}{\Delta t} = Df$$

where d is some constant.

If $$\frac{d}{\Delta t_a} = Df_a$$

and $$\frac{d}{\Delta t_b} = Df_b$$

replace in equation 1:

$$\frac{d}{\Delta t_b} = \left(\frac{Ftx_b}{Ftx_a}\right)\frac{d}{\Delta t_a}$$

Rearranging, we get:

$$\Delta t_b = \left(\frac{Ftx_a}{Ftx_b}\right)\Delta t_a$$

Then:

$$\Delta t_b = \frac{Ftx_a}{Ftx_b}\Delta t_a \qquad \text{Equation 2}$$

The time domain data entering from the mixer is sampled at time intervals of $\Delta t$ and converted to frequency domain data using a Discrete Fourier Transform (DFT). The resulting frequency data is presented in intervals of $\Delta\omega$ (note that $2\pi f = \Delta\omega$).

The frequency domain representation of the first set of sampling data is given by:

$$F_a(\Delta\omega_a \cdot k) = \sum_{n=0}^{N} x_a(\Delta t_a \cdot n) \cdot W_N^{(\Delta t_a \cdot n)(\Delta\omega_a k)}$$

where:

$$W_N = e^{\frac{-j \cdot 2\pi}{N}}$$

is a constant

A second DFT is performed on a second set of data having time interval $\Delta t_b$, which is inversely proportional to the transmission frequency. This transform produces data for N+1 frequencies at intervals of $\Delta\omega_b$.

The frequency domain representation of the second set of sampling data is given by:

$$F_b(\Delta\omega_b \cdot k) = \sum_{n=0}^{N} x_b(\Delta t_b \cdot n) \cdot W_N^{(\Delta t_b \cdot n)(\Delta\omega_b k)}$$

The frequency intervals are equal to $\Delta\omega*k$ in the exponent term $(\Delta t*n)(\Delta\omega*k)$. Within the Doppler frequency range, the value of k at the maximum amplitude is labeled "kd". The exponent value is then $(\Delta t*n*\Delta\omega)*kd$.

Inserting equations 1 and 2 into this exponent form, we get:

$$(\Delta t_b \cdot n \cdot \Delta\omega_b) \cdot kd = \left[\left(\frac{Ftx_a}{Ftx_b} \cdot \Delta t_a\right) \cdot n\right] \cdot \left[\left(\frac{Ftx_b}{Ftx_a} \cdot \Delta\omega_a\right) \cdot kd\right] = (\Delta t_a \cdot n \cdot \Delta\omega_a) \cdot kd$$

The maximum amplitude will therefor occur at the same increment, kd, in both DFTs. If the data is sampled at a rate proportional to the ratio of the transmit frequencies, the maximum Doppler beat signal for both DFTs will occur at the same frequency value $\Delta\omega*kd$. All other constant frequency sources (noise and other extraneous signals) will be shifted in the DFTs due to the difference in the sampling time intervals between the two DFTs. Correlating the two frequency spectra will produce a large apex at the frequency $\Delta\omega*kd$, clearly identifying the Doppler signal from all other signals. The centroid of this frequency can then be readily calculated. This centroid frequency will be treated as representing the velocity of the fluid.

The velocity is calculated using this centroid frequency with the general Doppler formula. The volumetric flow is then determined by multiplying by the velocity by the cross-sectional area of the pipe.

Figure 6:
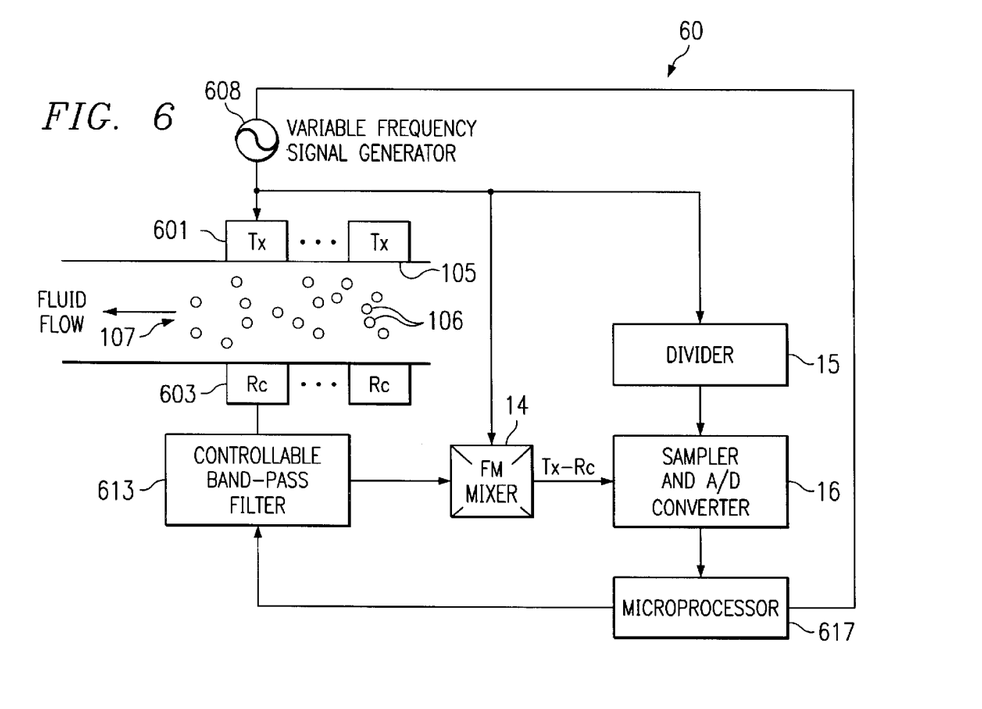
FIG. 6 is a diagram of the control functions and mechanical operations of an alternative embodiment of the present invention.

FIG. 6 illustrates a block diagram of an alternative embodiment of a flow meter 60 according to the present invention. In contrast to the embodiment of FIG. 1, this embodiment provides for more than two possible transmission frequencies. This would be useful in the event that a clearer and more accurate apex would be achievable with the addition of transmission frequencies beyond the first two.

Microprocessor 617 selects the desired transmission frequency from the Variable Frequency Signal Generator 608. The signal is then converted into ultrasonic energy by the transducer 601 and transmitted through the pipe wall 105 into the fluid 107 containing scatterers 106. Transducer 601 could include a plurality of piezoelectric transducers operating in different frequency ranges.

Reflected ultrasonic energy is received at Receiver 603 and there converted into an electrical signal. Receiver 603 could include a plurality of piezoelectric transducers operating in different frequency ranges. The electrical signal is then passed through controllable band-pass filter 613 whose characteristics are controlled by the Microprocessor 617. The filtered signal is then subtracted from the currently active transmission frequency in the FM mixer 14.

The signal resulting from the subtraction in Mixer 14 is then sampled at A/D Converter 16. In a preferred embodiment, the sampling rate at the A/D converter is always the currently active transmission frequency divided by a constant "N". Establishing this relationship between the A/D sampling rate and the transmission frequency obviates the requirement to perform the computationally demanding task of scaling frequency information in the DFT, while still ensuring that the sampling rate will remain high enough (i.e. above the Nyquist limit) to faithfully reproduce the frequencies appearing at the A/D converter 16.

The A/D sampling data is continuously sent to microprocessor 617, where sampling data associated with a particular transmission frequency is stored. The process of gathering data associated with a particular transmission frequency will be conducted at least twice, but can be conducted for an essentially unlimited number of frequencies.

The calculations of the DFTs, Correlation data, frequency distribution apex, and centroid frequency, as discussed in FIGS. 2, 3 and 4 are performed in the same manner in the embodiment of FIG. 6.

An advantage presented by the embodiment of FIG. 6 is that if the centroid (velocity representing) frequency cannot be determined with sufficient precision, or if there is still noise data which disrupts the velocity calculation after an initial set of transmission frequencies has been employed, microprocessor 617 can decide to select and send yet another transmission frequency and collect sampling data associated therewith. The above process may continue until sampling data sufficient for accurate determination of the fluid velocity has been collected.

Another advantage presented by the embodiment of FIG. 6 is the ability to select transmission frequencies based on the material properties and the size of the scatterers. By way of example, fine particles reflect higher frequencies, while coarse particles reflect lower frequencies.

Of course, one skilled in the art will recognize that the hardware illustrated in FIG. 6 is merely one way to implement the present invention. Alternate hardware embodiments are readily apparent and are clearly within the scope of the present invention.

Although the present invention and its advantages have been described in detail, it should be understood that various changes, substitutions and alterations can be made herein without departing from the spirit and scope of the invention as defined by the appended claims.

What is claimed is:

1. A method for determining a velocity of fluid flowing in a pipe, the method comprising the steps of:
   transmitting a periodic electrical signal at a plurality of frequencies;
   transducing said electrical signal into an ultrasonic signal;
   transmitting, at a first point along said pipe, said ultrasonic signal into said fluid flowing in said pipe;
   transducing, at a second point along said pipe, ultrasonic energy present at said second point along said pipe into electrical energy;
   mixing said electrical energy with said transmitted periodic electrical signal, thereby generating a mixed signal;
   sampling the mixed signal resulting from said mixing step, wherein said step of sampling has a sampling rate and produces sampling data;
   determining a frequency representing the fluid velocity from said sampling data produced in said sampling step and;
   calculating the fluid velocity from said frequency representing the fluid velocity, wherein the step of determining said frequency representing fluid velocity comprises the steps of:
   generating frequency spectrum data from said sampling data produced in said sampling step for a plurality of frequencies of transmission of a periodic electrical signal, thereby generating a data set comprising energy values associated with individual frequency values, each data set being associated with a transmission frequency;
   scaling the frequency values in each said data set by an amount inversely proportional to the transmission frequency associated with each said data set, thereby generating scaled frequency spectrum data associated with each transmission frequency;
   correlating the scaled frequency spectrum data generated for all frequencies transmitted, thereby producing a correlation function, said function having a frequency range which includes a Doppler frequency distribution;
   identifying said Doppler frequency distribution within said correlation function frequency range, said Doppler frequency distribution having a centroid frequency; and
   isolating, from said Doppler frequency distribution, said frequency representing said fluid velocity.

2. The method of claim 1, wherein the sampling rate in said step of sampling is set equal to an active frequency of said step of transmitting a periodic electrical signal divided by a constant value.

3. The method of claim 1, wherein the step of sampling is conducted at a constant rate for all transmission frequencies, and the scaled frequency spectrum data is obtained by multiplying the frequency values in each said data set by an amount inversely proportional to the transmission frequency associated with each said data set.

4. The method of claim 1, wherein the step of calculating a frequency representing fluid velocity comprises computing the centroid frequency of the Doppler frequency distribution.

5. A system for determining a velocity of fluid flowing in a pipe comprising:
   means for transmitting a periodic electrical signal at a plurality of frequencies;
   means for transducing said electrical signal into an ultrasonic signal and
   transmitting, at a first point along said pipe, said ultrasonic signal into said fluid;
   means for receiving and transducing, at a second point along said pipe, ultrasonic energy present at said second point along said pipe into electrical energy;
   means for mixing said electrical energy with said transmitted periodic electrical signal, thereby outputting a mixed signal;
   means for sampling said mixed signal, wherein said means for sampling has a sampling rate and produces sampling data; and
   means for processing including:
      means for determining a frequency representing fluid velocity from said sampling data produced by said means for sampling; and
      means for calculating the fluid velocity from said frequency representing fluid velocity,
   wherein the means for determining said frequency representing fluid velocity comprises:
   means for generating frequency spectrum data from said sampling data produced by said means for sampling for a plurality of frequencies of transmission of said periodic electrical signal, thereby generating a data set comprising energy values associated with individual frequency values, each said data set being associated with a transmission frequency;
   means for scaling the frequency values in each said data set by an amount inversely proportional to the transmission frequency associated with each said data set, thereby generating scaled frequency spectrum data associated with each transmission frequency;
   means for correlating the scaled frequency spectrum data generated for all frequencies transmitted, thereby producing a correlation function, said correlation function comprising a frequency range which includes a Doppler frequency distribution;

means for identifying said Doppler frequency distribution within said correlation function frequency range, said Doppler frequency distribution having a centroid frequency; and means for isolating from said identified Doppler frequency distribution, said frequency representing fluid velocity.

6. The system of claim 5 further comprising means for setting said sampling rate proportional to a frequency of a specific transmitted periodic signal divided by a constant value.

7. The system of claim 5, wherein said means for sampling samples at a rate which is constant for all transmission frequencies used, and the means for scaling comprises means for multiplying the frequency values in each said data set by an amount inversely proportional to the transmission frequency associated with said data set.

8. The system of claim 5, wherein the means for calculating a frequency representing fluid velocity comprises means for computing the centroid frequency of the Doppler frequency distribution.

9. A flow meter for extracting velocity related information from fluid containing scatterers flowing through a container comprising:

means for transmitting ultrasonic energy into said fluid at at least two frequencies;

means for receiving ultrasonic energy reflected from said scatterers in said fluid;

means for mixing received reflected energy with an active transmission frequency of said at least two frequencies to derive an output signal consisting of a plurality of frequencies; and means for isolating fluid velocity related frequencies from said output signal.

10. The flow meter of claim 9 wherein the means for transmitting comprises means for outputting energy at a selectable frequency.

11. The flow meter of claims 10, wherein the means for transmitting the reflected energy to said means for mixing comprises means for transducing the reflected ultrasonic energy into electrical energy, said means for transducing the ultrasonic energy into electrical energy being electrically coupled with said means for mixing.

12. The flow meter of claim 11, wherein the means for transducing the ultrasonic energy into electrical energy comprises at least one piezoelectric transducer.

13. The flow meter of claim 11, further comprising:

a first means for filtering located between the means for generating electrical energy and the means for transducing said electrical energy into ultrasonic energy.

14. The flow meter of claim 13, further comprising:

second means for filtering located between the means for transducing the ultrasonic energy into electrical energy and the means for mixing.

15. The flow meter of claim 14, wherein the means for isolating the fluid velocity related frequencies from other frequencies comprises:

means for generating, for each transmission frequency employed, an energy distribution as a function of frequency of a signal emerging from the means for mixing, thereby generating an energy distribution associated with said each transmission frequency;

means for scaling frequency values within each said energy distribution by an amount inversely proportional to a value of said each transmission frequency associated with each said energy distribution, thereby creating scaled energy distributions, each said scaled energy distribution being associated with a particular transmission frequency; and processing means including:

means for correlating said scaled energy distributions thereby creating a correlation function, said correlation function having a frequency range which includes a Doppler frequency distribution;

means for identifying the Doppler frequency distribution within said correlation function frequency range, the Doppler frequency distribution having a centroid frequency; and means for calculating the centroid frequency of said Doppler frequency distribution.

16. The flow meter of claim 15, wherein the container through which said fluid flows has a volume defined by certain dimensions wherein the processing means further includes:

means for computing a fluid flow velocity based on a centroid frequency and said dimensions of said fluid container.

17. The flow meter of claim 9, wherein the means for transmitting comprises at least one piezoelectric transducer.

18. A method for extracting velocity related information from a fluid containing scatterers flowing through a container comprising the steps of:

transmitting ultrasonic energy into said fluid at at least two frequencies;

transmitting ultrasonic energy reflected from said scatterers in said fluid to a mixer;

mixing said reflected energy with a transmission frequency of said at least two frequencies to derive an output signal consisting of a plurality of frequencies; and isolating velocity related frequencies from said output signal.

19. The method of claim 18, wherein the step of transmitting ultrasonic energy into said fluid comprises the steps of:

generating electrical energy; and transducing said electrical energy into ultrasonic energy.

20. The method of claim 19, wherein the step of generating electrical energy comprises outputting said electrical energy at a selectable frequency.

21. The method of claim 19, wherein the step of transducing comprises the step of transducing piezoelectrically.

22. The method of claim 19, wherein the step of transmitting ultrasonic energy reflected from said scatterers to a mixer comprises the steps of transducing the ultrasonic energy into electrical energy and sending said electrical energy to said mixer.

23. The method of claim 22, wherein the step of transducing the ultrasonic energy into electrical energy comprises the step of transducing piezoelectrically.

24. The method of claim 22, further including a first filtering step, said first filtering step performed between the step of generating electrical energy and the step of transducing said electrical energy into ultrasonic energy.

25. The method of claim 24, further including a second filtering step, said second filtering step performed between said step of transducing the ultrasonic energy into electrical energy and said step of mixing.

26. The method of claim 25, wherein the step of isolating the fluid velocity related frequencies from other frequencies comprises the steps of:

generating, for each transmission frequency employed, an energy distribution as a function of frequency of a signal generated by said step of mixing, thereby generating an energy distribution associated with said each transmission frequency;

scaling frequency values within said energy distribution by an amount inversely proportional to a value of said each transmission frequency associated with each said energy distribution, thereby creating scaled energy distributions, each said scaled energy distribution being associated with a particular transmission frequency;

correlating said scaled energy distributions thereby creating a correlation function, said correlation function having a frequency range which includes a Doppler frequency distribution;

identifying the Doppler frequency distribution within said correlation function frequency range, said Doppler frequency distribution having a centroid frequency; and calculating the centroid frequency within said Doppler frequency distribution, wherein said centroid frequency represents fluid velocity.

27. The method of claim 26 wherein the container through which said fluid flows has a volume defined by certain dimensions, and wherein the method further comprises the step of computing the fluid velocity based on said centroid frequency and said dimensions of said fluid container.

28. A system for measuring fluid flow velocity in a pipe, said system comprising:

means for transducing, at a first point along said pipe, at least two frequencies into said fluid flowing within said pipe;

means for measuring at a second point along said pipe, frequencies reflected from said fluid during transduction of said at least two frequencies;

means for comparing measured ones of said frequencies to eliminate frequencies unrelated to fluid velocity, and means for deriving the velocity of said fluid flow from said compared measured frequencies.

29. The system of claim 28, wherein said transducing means includes means for spacing said at least two frequencies in time.

30. The system of claim 28, wherein the frequencies transduced into said fluid are reflected by scatterers contained in said fluid.

31. A method for measuring fluid flow velocity in a pipe, the method comprising the steps of:

transducing, at a first point along said pipe, at least two frequencies into said fluid flowing within said pipe;

measuring at a second point along said pipe, frequencies reflected from said flowing fluid during transduction of said at least two frequencies;

comparing measured ones of said frequencies to eliminate frequencies unrelated to fluid velocity, and deriving the velocity of said flowing fluid from said compared measured frequencies.

32. The method of claim 31, wherein said step of transducing comprises the step of spacing said at least two frequencies in time.

33. The method of claim 31, wherein said transducing step causes transduced ones of said frequencies to be reflected by scatterers contained in said fluid.

34. A method for measuring the velocity of one or more objects comprising the steps of:

transmitting waves toward said one or more objects at a plurality of frequencies, said one or more objects having a velocity;

measuring energy reflected from said one or more objects for each transmission frequency, said reflected energy having a frequency range;

eliminating frequencies unrelated to the velocity of said one or more objects, thereby identifying a frequency which represents the velocity of said one or more objects;

calculating the velocity of said one or more objects from said identified frequency.

35. The method of claim 34, wherein the step of eliminating frequencies unrelated to velocity comprises:

mixing each transmission frequency with the energy reflected from said one or more objects for that transmission frequency, thereby generating mixed reflected energy, said mixed reflected energy having a frequency range;

generating a frequency domain representation of the mixed reflected energy for each transmission frequency, thereby creating a data set associated with each transmission frequency which associates an energy value with each frequency in the frequency range of the mixed reflected energy;

scaling the frequency values in each said data set by a scaling factor inversely proportional to the transmission frequency associated with each said data set, thereby generating scaled data sets associated with each transmission frequency;

correlating the scaled data sets for all frequencies transmitted, thereby generating a correlation result, said correlation result having a Doppler frequency distribution;

identifying the Doppler frequency distribution within said correlation result; and determining a frequency which represents velocity within said Doppler frequency distribution.

* * * * *

UNITED STATES PATENT AND TRADEMARK OFFICE
CERTIFICATE OF CORRECTION

PATENT NO. : 6,408,699 B1
DATED : June 25, 2002
INVENTOR(S) : Robert A. Moss et al.

It is certified that error appears in the above-identified patent and that said Letters Patent is hereby corrected as shown below:

<u>Column 5,</u>
Line 21, delete "anal" and insert -- analog --

Signed and Sealed this

Thirtieth Day of September, 2003

JAMES E. ROGAN
*Director of the United States Patent and Trademark Office*